Aug. 14, 1951  R. W. WOLLENTIN ET AL  2,563,900
PHOSPHOR AND METHOD OF MAKING
Filed June 21, 1947
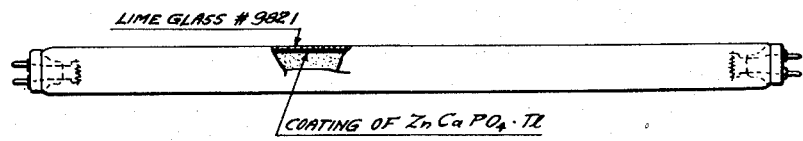
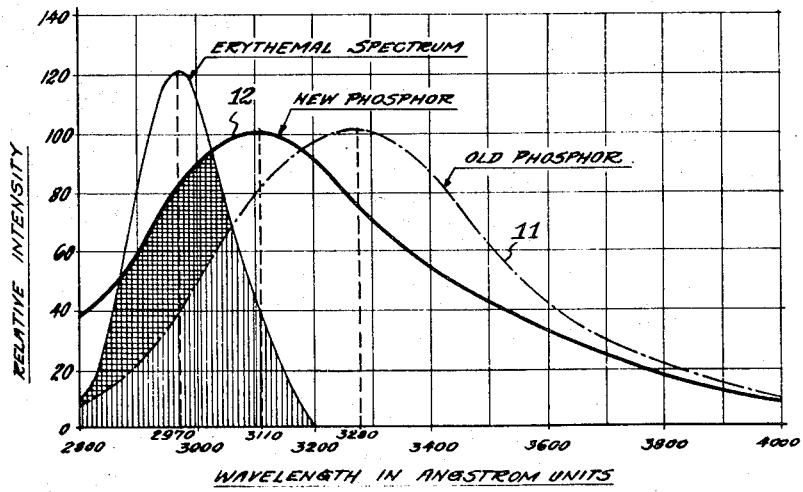
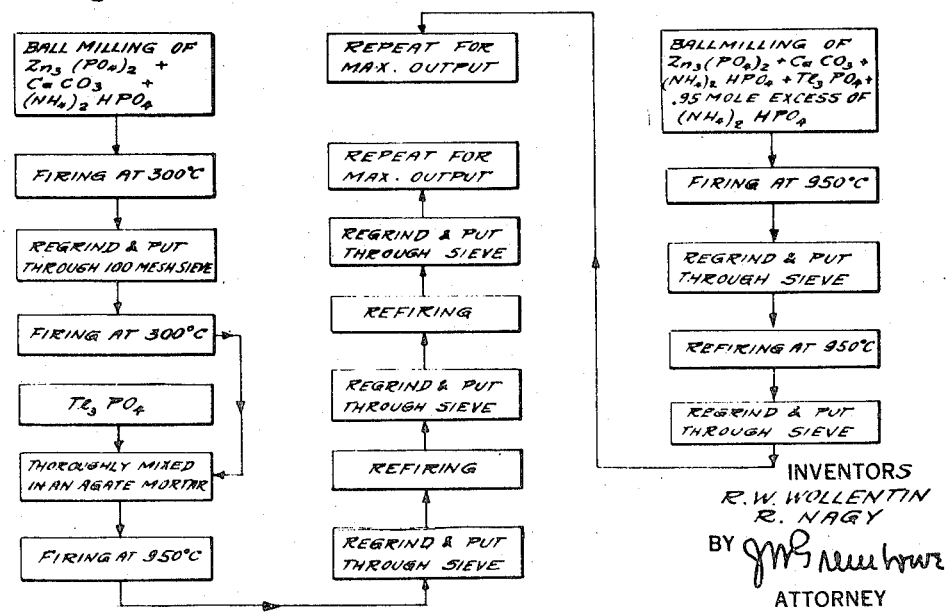
INVENTORS
R. W. WOLLENTIN
R. NAGY
BY
ATTORNEY Patented Aug. 14, 1951

2,563,900

UNITED STATES PATENT OFFICE 2,563,900

PHOSPHOR AND METHOD OF MAKING

Robert W. Wollentin, Verona, and Rudolph Nagy, Bloomfield, N. J., assignors to Westinghouse Electric Corporation, East Pittsburgh, Pa., a corporation of Pennsylvania Application June 21, 1947, Serial No. 756,242

19 Claims. (Cl. 176—122)

This invention relates to phosphors and methods of making and, more particularly, to a phosphor having a large response in the erythemal region of the spectrum.

The principal object of our invention, generally considered, is to produce an efficient phosphor whose peak of emission is near that of the erythemal spectrum, say at about 3110 A. U., whereby it has more than twice the erythemal response of thallium-activated calcium phosphate phosphor.

Another object of our invention is to produce a thallium-activated solid solution of zinc and calcium phosphates, particularly useful for the production of erythemal radiations.

A further object of our invention is to add an ingredient to thallium-activated calcium phosphate which will shift the peak of the emission about 200 A. U. toward the shorter wave lengths, thereby increasing its efficiency for producing erythemal radiations.

A still further object of our invention is to produce a fluorescent lamp adapted to generate erythemal radiations at high efficiency, for example, more than forty times the erythemal effect per watt as filament-ballasted discharge-devices commonly called RS sun-lamps, and which phosphor has better maintenance than those formerly employed for the purpose.

Other objects and advantages of the invention will become apparent as the description proceeds.

Referring to the drawing:

Figure 1 is an elevational view with a part in longitudinal section of a fluorescent lamp embodying our invention.

Figure 2 is a diagram showing the relationship between the fluorescent response of a phosphor embodying our invention, the phosphor previously used for the purpose, and the erythemal spectrum, the ordinates of the erythemal curve showing relative erythemal effectiveness over the range of wave-lengths covered.

Figure 3 is a flow diagram illustrating one embodiment of our method.

Figure 4 is a flow diagram illustrating another embodiment of our method.

The sunlamp phosphor previously generally used for the purpose of producing erythemal radiations is calcium ortho phosphate activated with thallium. The emission spectrum of this phosphor has a peak at about 3280 A. U. and the curve thereof is designated by the reference character 11 in Figure 2. The efficiency of this phosphor is low, because only a small portion of the emitted fluorescence falls within the accepted erythemal region. We have been able to produce a new phosphor, the curve of emission formation of which is represented by the reference character 12 in Figure 2, where the peak of emission is at about 3110 A. U. In this way, we obtain about twice the erythemal response from our phosphor as from thallium-activated calcium phosphate, as Figure 2 indicates.

In the preparation of our phosphor, we produce a solid solution of zinc and calcium ortho phosphates activated with thallium. The zinc can be in the form of zinc oxide, zinc carbonate or zinc phosphate. The calcium reacts best when in the form of the oxide or carbonate, but other pure calcium salts can be used. The phosphate radical is best supplied by the compound di-ammonium acid phosphate, but other salts such as calcium acid phosphate have also been found to be usable. Following are two procedures for using a formula, given below, to produce a good phosphor.

Formula I

| Constituents: | Moles |
|---|---|
| $Zn_3(PO_4)_2$ | 0.337 |
| $CaCO_3$ | 14.510 |
| $(NH_4)_2HPO_4$ | 9.670 |
| $Tl_3PO_4$ | .166 |

In producing the phosphor from the above formula, the first three ingredients are finely ground and thoroughly mixed for two hours, desirably by ball-milling, and then fired at 300° C. It is best to regrind the heated mass and put through a 100 mesh sieve before heating for a second time at 300° C. The thallium ortho phosphate is desirably added to the finely powdered zinc calcium ortho phosphate so produced and thoroughly mixed, desirably in an agate mortar. The firing temperature is then desirably raised to 950° C. and the sample heated for one half hour. The phosphor is then preferably reground, sieved, and refired for about 20 minutes. The process of refiring and sieving is then desirably repeated at least two times, or until the highest output is obtained.

During the firing, only the carbon dioxide, ammonia, water, and part of the thallium are removed by vaporization. Enough thallium remains, as only a very small proportion is needed for activation, as in connection with the formation of thallium-activated calcium orthophosphate, disclosed in the Roberts Patent No. 2,447,210. This, of course, means that by condensing the $CaCO_3$ and $(NH_4)_2HPO_4$ to $Ca_3(PO_4)_2$, the mole ratio is divided by three, while that of the $Zn_3(PO_4)_2$ is unchanged.

Instead of following the above procedure, which is represented by the flow diagram of Figure 3, we may finely grind and thoroughly mix, as by ball-milling, all the ingredients together, with a .95 mole excess of ammonium phosphate. The heating of the ingredients is desirably done at about 950° C. for one-half hour, and then the mixture is ground and sieved. The process of heating and grinding is continued at 15 minute intervals until the highest or optimum output is obtained. This alternative procedure is represented by the flow diagram of Figure 4. Figure 1 represents a fluorescent lamp using a phosphor of our invention.

Instead of representing the ingredients in mole proportions, we may make a batch of the 8% tertiary zinc calcium phosphate phosphor, about as above represented, the total of which weighs about one half a kilogram after firing, by mixing ingredients in the following proportions:

Formula II

| Constituents: | Grams or parts by weight |
| --- | --- |
| $Zn_3(PO_4)_2$ (10% $H_2O$) | 58 |
| $CaCO_3$ | 580 |
| $(NH_4)_2HPO_4$ | 510.9 |

The above ingredients should be ball-milled, or otherwise finely ground and thoroughly mixed, for about two hours and fired at 300° C. in a shallow silica tray, say approximately 5" x 14" x 1½" deep. The material may then be ball-milled for one half hour, refired at 300° C. for one hour, and then ball-milled for one hour with an admixture of 50.18 grams of thallium sulphate, $Tl_2SO_4$, or the corresponding mole proportion of thallium ortho phosphate. The mixture may then be fired at 950° C. for about ¾ hour, and refired a number of times for 15 minute intervals, preferably with grinding between intervals of heating. The firing removes the water of crystallization, leaving only 52.7 grams of $Zn_3(PO_4)_2$, and the $CaCO_3$ and $(NH_4)_2HPO_4$ react to form 599.3 grams of $Ca_3(PO_4)_2$.

Although, we have specified a preferred proportion of tertiary zinc phosphate or zinc ortho phosphate of about 8% in the finished phosphor, yet we do not wish to be limited to this, as we may get a desirable shift toward the shorter wave lengths by adding varying proportions of such phosphate to the other ingredients. Said proportions may vary, for example, between 4% and 12% of the finished phosphor, giving a range of shifting of the wave length from a peak at about 3155 A. U. for the addition of 4% of tertiary zinc phosphate, to a peak at about 3040 A. U. for the addition of about 12% of tertiary zinc phosphate. Although this alone appears to show that it is desirable to have a larger proportion of tertiary zinc phosphate than 8%, because of the greater shift in wave length for proportions up to at least 12%, yet we have found that the intensity of the radiations generated by the phosphor falls off when the proportion of the tertiary zinc phosphate is increased above 8%.

Although we have specified tertiary zinc phosphate as a preferred ingredient for causing a shift toward the shorter wave lengths, to thereby get increased efficiency in the generation of erythemal radiations, as well as providing a considerable proportion of bactericidal energy, we do not wish to be limited to this material as a similar shift toward the shorter wave lengths may be obtained by the addition of one of other materials. Our experiments show that as alternatives to tertiary zinc phosphate for shifting the emission spectrum toward the shorter wave lengths, we may use one of the following materials: tertiary magnesium phosphate, zinc sulphate, or magnesium sulphate. In using magnesium phosphate, we have found that the optimum amount appears to be about 8%, with which the emission peak was shifted to 3190 A. U. The use of zinc sulphate and magnesium suphate, although effective in shifting the wave length is not recommended because of the decrease in efficiency using such materials.

From the foregoing, it will be seen that we have produced an improved phosphor in which the emission spectrum is shifted to such an extent toward the shorter wave lengths, that it is more efficient for the production of erythema. Lamps such as shown in Figure 1 and made with it have better maintenance, and produce only a very small proportion of visible radiation and about 2½ times the output in the erythemal region as lamps made with the regular calcium thallium phosphate phosphor. This means that such a 40 watt fluorescent lamp with suitable electrodes, as illustrated, located at the ends of the sealed envelope made of a lime glass, such as Corning Code No. 9821, for example, which transmits the erythemal radiations of wave-lengths longer than 2600 A. U. but is impermeable to radiations of shorter wave lengths, sustains therebetween a low-pressure positive-column discharge through the usual fluorescent lamp filling of argon and mercury vapor, whereby to generate an abundance of short wave-length radiations, including 2537 A. U. wave-length. The internal surface of the envelope is provided with a coating of the novel phosphor, as here disclosed, and this when excited by the generated radiations, emits a large amount of radiations in the erythemal range between below 2800 and 3200 A. U. Thus such a lamp produces about 40 times the erythemal effect per watt as the filament-ballasted so-called RS sunlamp, as manufactured by the assignee of the present application.

Although preferred embodiments of our invention have been disclosed, it will be understood that modifications may be made within the spirit and scope of the appended claims.

We claim:

1. A phosphor having a high output in the erythemal region and only a very small output of visible radiations, consisting essentially of a thallium-activated phosphate of calcium with from 4% to 12% of zinc phosphate in solid solution, and having its peak of emission at between about 3040 and 3155 A. U.

2. The method of making a phosphor with a high output in the erythemal region and only a very small output of visible radiations, comprising ball milling together 3.37 moles of tertiary zinc phosphate; 14.51 moles of calcium carbonate, and 9.67 moles of di-ammonium acid phosphate for two hours, firing at 300° C., regrinding the heated mass and putting it through a 100 mesh sieve, firing, heating a second time at 300° C., adding .166 mole of tertiary thallium phosphate, thoroughly mixing, raising the firing temperature to 950° C. for one half hour, regrinding, sieving, refiring for 20 minutes, regrinding, sieving, refiring, sieving, and continuing until the maximum output is obtained.

3. The method of making a phosphor with a high output in the erythemal region and only a very small output of visible radiations, comprising ball-milling together .337 mole of tertiary zinc phosphate, 14.51 moles of calcium carbonate, 10.62 moles of di-ammonium phosphate, .166 mole of thallium phosphate, heating at 950° C. for one half hour, grinding, sieving, reheating, grinding, sieving, and repeating the heating and grinding at 15 minute intervals until the maximum output is obtained.

4. The method of making a phosphor with a high output in the erythemal region and only a very small output of visible radiations, comprising ball-milling together 58 grams of tertiary zinc phosphate with 10% water of crystallization, 580 grams of calcium carbonate, 510.9 grams of di-ammonium acid phosphate for two hours, firing at about 300° C. in a shallow silica tray, ball-milling for about one half hour, refiring at 300° C. for one hour, and ball-milling for one hour with an admixture of 50.18 grams of thallium sulphate, firing the mixture at 950° C. for ¾ hour, and refiring a number of times for 15 minute intervals until the maximum output is obtained.

5. The method of causing the radiation output from a thallium activated calcium phosphate phosphor to shift toward the short wave lengths in the ultra-violet region, comprising adding thereto between 4 and 12 percent of a material of the group consisting of tertiary zinc phosphate and tertiary magnesium phosphate.

6. The method of causing the peak of the emission from a thallium activated calcium phosphate phosphor to shift toward the shorter wave lengths, comprising adding thereto about 8% of tertiary zinc phosphate.

7. A fluorescent composition of unfused and unsintered calcium zinc orthophosphate forming a phosphor matrix, containing a minor proportion of thallium in activating combination with the phosphate structure, the zinc orthophosphate being from 4% to 12% of the composition, and when subjected to 2537 A. U. radiation emitting radiation that extends from below 2800 A. U., with a peak at between about 3040 and 3155 A. U., to 4000 A. U., and is rich in erythemal energy with wave-lengths from below 2800 A. U. to 3200 A. U., but essentially free of visible luminescence.

8. A phosphor for fluorescent lamps consisting of the fired reaction product of the following constituents in about the following proportions: tertiary zinc phosphate, .337 mole; calcium carbonate, 14.51 moles; di-ammonium acid phosphate, 9.67 moles; and tertiary thallium phosphate, .166 mole.

9. A phosphor for fluorescent lamps, having a high output in the erythemal region, only a very small output of visible radiations, and a peak of emission between about 3040 A. U. and 3155 A. U., consisting of the fired reaction product of the following constituents: calcium carbonate, di-ammonium acid phosphate to form therewith calcium phosphate, an activating proportion of thallium sulphate, and enough tertiary zinc phosphate so that it appears in said phosphor in solid solution as from 4% to 12% thereof.

10. A phosphor for fluorescent lamps consisting of the fired reaction product of the following constituents in about the following proportions by weight: tertiary zinc phosphate with about 10% water of crystallization, 58 parts; calcium carbonate, 580 parts; di-ammonium acid phosphate, 510.9 parts; and thallium sulphate, 50.18 parts.

11. The method of making a phosphor with a high output in the erythemal region, only a very small output of visible radiations, and a peak of emission between about 3040 A. U. and 3155 A. U., comprising grinding together calcium carbonate, di-ammonium acid phosphate to form therewith calcium phosphate, and enough tertiary zinc phosphate so that it appears as from 4% to 12% in solid solution in the phosphor produced, firing at 300° C., regrinding the heated mass and putting it through a sieve, firing by heating a second time at 300° C., adding an activating proportion of tertiary thallium phosphate, thoroughly mixing, raising the firing temperature to 950° C. for one half hour, regrinding, sieving, refiring for 20 minutes, regrinding, sieving, refiring, sieving, and continuing until the maximum output is obtained.

12. The method of making a phosphor with a high output in the erythemal region, only a very small output of visible radiations, and a peak of emission between about 3040 A. U. and 3155 A. U., comprising grinding together calcium carbonate, an activating proportion of tertiary thallium phosphate, about 10% excess of ammonium phosphate, and enough tertiary zinc phosphate so that it appears as from 4% to 12% in solid solution in the phosphor produced, heating at 950° C. for about one half hour, grinding, sieving, heating, grinding and sieving, and continuing the heating and grinding for 15 minute intervals until the maximum output is obtained.

13. The method of making a phosphor with a high output in the erythemal region and only a very small output of visible radiations, and a peak of emission between about 3040 A. U. and 3155 A. U., comprising grinding together calcium carbonate, di-ammonium acid phosphate, and enough tertiary zinc phosphate so that it appears as from 4% to 12% in solid solution in the phosphor produced, firing at about 300° C., grinding for about one half hour, refiring at 300° C. for one hour, and grinding for one hour with an activating admixture of thallium sulphate, firing the mixture at 950° C. for ¾ hour, and refiring a number of times for 15 minute intervals until the maximum output is obtained.

14. A phosphor for fluorescent lamps consisting of the fired reaction product of the following constituents in about the stated proportions: calcium carbonate, 14.51 moles; di-ammonium acid phosphate, 9.67 moles; tertiary thallium phosphate, .166 mole; and enough tertiary zinc phosphate to make from 4% to 12% by weight of the finished phosphor.

15. A phosphor for fluorescent lamps consisting of the fired reaction product of the following constituents in about the following proportions by weight: calcium carbonate, 580 parts; di-ammonium acid phosphate, 510.9 parts; thallium sulphate, 50.18 parts; and enough tertiary zinc phosphate to make from 4% to 12% by weight of the finished phosphor.

16. A generator for ultra-violet radiations especially rich in the erythemal band and including a considerable proportion of bactericidal energy, but essentially free of visible luminescence, comprising a low-pressure mercury-vapor discharge device whose radiation is rich in energy of 2537 A. U. wave-length, and which includes a sealed envelope of glass impermeable to radiations of wave-length shorter than about 2600 A. U., but which transmits ultra-violet radiation of longer wave-length, in combination with a coating on its interior surface of fluorescent calcium zinc orthophosphate, activated by thallium, and excitable by the 2537 A. U. energy to the emission of radiation of erythemal wave-lengths between 2800 and 3200 A. U., the proportion of the zinc orthophosphate component in the finished phosphor being in the range from 4% to 12%, and thereby causing the peak of the spectrum emitted by said generator to shift, from beyond the range of erythemal effectiveness of said radiations, towards shorter wave-lengths, so as to actually lie between about 3040 and 3155 A. U., to greatly increase the bactericidal efficiency and at least double the erythemal efficiency, as compared with that of a corresponding generator having a phosphor of merely zinc-free fluorescent calcium orthophosphate, activated by thallium.

17. A generator of ultra-violet radiations especially rich in the erythemal band and including a considerable proportion of bactericidal energy, but essentially free of visible luminescence, comprising a low-pressure mercury-vapor discharge device whose radiation is rich in energy of 2537 A. U. wave-length and which includes a sealed envelope of glass impermeable to radiations of wave-length shorter than about 2600 A. U., but which transmits ultra-violet radiations of longer wave-length, in combination with a coating on its interior surface of fluorescent calcium zinc orthophosphate activated by thallium and excitable by the 2537 A. U. energy to the emission of radiation of erythemal wave-lengths between 2800 and 3200 A. U., the proportion of the zinc orthophosphate component in the finished phosphor being the range from 4% to 12%, and thereby causing the peak of the emitted spectrum to shift from beyond the range of erythemal effectiveness of said radiations toward the shorter wave-lengths so as to actually lie within the erythemal effectiveness spectrum, thereby greatly increasing the efficiency of generation of such radiations as compared with that of a corresponding generator having a phosphor of zinc-free thallium activated calcium orthophosphate.

18. A generator of ultra-violet radiations especially rich in the erythemal band and including a considerable proportion of bactericidal energy, but essentially free of visible luminescence, comprising a low-pressure mercury-vapor discharge device whose radiation is rich in 2537 A. U. wave-length and which includes a sealed envelope of glass impermeable to radiations of wave-length shorter than about 2600 A. U., but which transmits ultra-violet radiations of longer wave-length, in combination with a coating on its interior surface of fluorescent calcium zinc orthophosphate activated by thallium and consisting essentially of the fired reaction product of the following ingredients in about the stated proportions: tertiary zinc phosphate, .337 mole; calcium carbonate, 14.51 moles; di-ammonium acid phosphate, 9.67 moles; and tertiary thallium phosphate, .166 mole; said coating being excitable by the 2537 A. U. wave-length to the emission of radiation in erythemal wave-lengths between 2800 and 3200 A. U. the zinc causing the peak of the emitted spectrum to shift toward the shorter wave-lengths, from beyond, to actually be within, the range of erythemal effectiveness, thereby increasing the efficiency of generation of such radiations, as compared with that of a zinc-free thallium-activated calcium orthophosphate.

19. A generator of ultra-violet radiations especially rich in the erythemal band and including a considerable proportion of bactericidal energy, but essentially free of visible luminescence, comprising a low-pressure mercury-vapor discharge device whose radiation is rich in 2537 A. U. wave-length and which includes a sealed envelope of glass impermeable to radiations of wave-length shorter than about 2600 A. U., but which transmits ultra-violet radiations of longer wave-length, in combination with a coating on its interior surface of fluorescent calcium zinc orthophosphate activated by thallium and consisting essentially of the fired reaction product of the following ingredients in about the stated proportions: tertiary zinc phosphate, 52.7 parts; calcium orthophosphate, 599.3 parts; and tertiary thallium phosphate, 50.18 parts; said coating being excitable by the 2537 A. U. wave-length to the emission of radiation in erythemal wave-lengths between 2800 and 3200 A. U. the zinc causing the peak of the emitted spectrum to shift toward the shorter wave-lengths, from beyond, to actually be within, the range of erythemal effectiveness thereby increasing the efficiency of generation of such radiations, as compared with that of a zinc-free thallium-activated calcium orthophosphate.

ROBERT W. WOLLENTIN.
RUDOLPH NAGY.

REFERENCES CITED

The following references are of record in the file of this patent:

UNITED STATES PATENTS

| Number | Name | Date |
| --- | --- | --- |
| 2,272,992 | Hebo | Feb. 10, 1942 |
| 2,409,771 | Lowry | Oct. 22, 1946 |
| 2,417,038 | Clapp | Mar. 4, 1947 |
| 2,447,210 | Roberts | Aug. 17, 1948 |

FOREIGN PATENTS

| Number | Country | Date |
| --- | --- | --- |
| 577,693 | Great Britain | May 28, 1946 |

OTHER REFERENCES

Publication, The Electrochemical Society Pre Print 91-11, April 1947.